US008214763B2

(12) United States Patent
Brunkhorst et al.

(10) Patent No.: US 8,214,763 B2
(45) Date of Patent: Jul. 3, 2012

(54) AUTO-POSITIONING A CONTEXT MENU ON A GUI

(75) Inventors: Richard Adam Brunkhorst, Raleigh, NC (US); Joel Duquene, Raleigh, NC (US); Eric Pratt Hambright, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 12/409,793

(22) Filed: Mar. 24, 2009

(65) Prior Publication Data

US 2010/0251175 A1 Sep. 30, 2010

(51) Int. Cl.
*G06F 3/048* (2006.01)
(52) U.S. Cl. ......... 715/817; 715/784; 715/811; 715/708
(58) Field of Classification Search .................. 715/764, 715/762, 709, 708, 811, 817, 784
See application file for complete search history.

(56) References Cited

U.S. PATENT DOCUMENTS

| | | | | | |
|---|---|---|---|---|---|
| 5,469,540 A | * | 11/1995 | Powers et al. | ................. | 715/203 |
| 5,550,967 A | * | 8/1996 | Brewer et al. | ................. | 715/709 |
| 5,602,996 A | * | 2/1997 | Powers et al. | ................. | 715/807 |
| 5,621,878 A | * | 4/1997 | Owens et al. | ................. | 715/769 |
| 5,644,738 A | * | 7/1997 | Goldman et al. | ............ | 715/825 |
| 5,655,093 A | * | 8/1997 | Frid-Nielsen | ................. | 715/856 |
| 5,692,143 A | * | 11/1997 | Johnson et al. | ................. | 715/764 |
| 5,715,415 A | * | 2/1998 | Dazey et al. | ................... | 715/708 |
| 5,757,371 A | * | 5/1998 | Oran et al. | ..................... | 715/779 |
| 5,760,776 A | * | 6/1998 | McGurrin et al. | ............ | 715/841 |
| 5,805,167 A | * | 9/1998 | van Cruyningen | ........... | 715/808 |
| 5,828,376 A | * | 10/1998 | Solimene et al. | ............. | 715/821 |
| 5,854,629 A | * | 12/1998 | Redpath | ........................ | 715/830 |
| 5,892,512 A | * | 4/1999 | Donnelly et al. | ............. | 715/764 |
| 5,920,316 A | * | 7/1999 | Oran et al. | ..................... | 715/779 |
| 6,031,535 A | * | 2/2000 | Barton | ......................... | 715/840 |
| 6,100,885 A | * | 8/2000 | Donnelly et al. | ............. | 715/762 |
| 6,118,427 A | * | 9/2000 | Buxton et al. | ................. | 345/629 |
| 6,121,965 A | * | 9/2000 | Kenney et al. | ................ | 715/810 |
| 6,160,554 A | * | 12/2000 | Krause | ......................... | 715/804 |
| 6,191,800 B1 | * | 2/2001 | Arenburg et al. | ............. | 345/505 |
| 6,307,544 B1 | * | 10/2001 | Harding | ....................... | 715/709 |
| 6,452,607 B1 | * | 9/2002 | Livingston | .................... | 715/705 |
| 7,484,185 B2 | * | 1/2009 | Farrington et al. | ........... | 715/860 |
| 2003/0048302 A1 | * | 3/2003 | Quan, Jr. | ....................... | 345/764 |
| 2003/0214538 A1 | * | 11/2003 | Farrington et al. | ........... | 345/854 |
| 2004/0145601 A1 | * | 7/2004 | Brielmann et al. | .......... | 345/708 |
| 2004/0263475 A1 | * | 12/2004 | Wecker et al. | ................ | 345/157 |
| 2005/0039141 A1 | * | 2/2005 | Burke et al. | .................. | 715/810 |
| 2005/0097477 A1 | * | 5/2005 | Camara et al. | ................ | 715/825 |
| 2006/0004843 A1 | * | 1/2006 | Tafoya et al. | ................. | 707/102 |
| 2006/0200780 A1 | * | 9/2006 | Iwema et al. | ................. | 715/810 |
| 2007/0083812 A1 | * | 4/2007 | Hudson et al. | ............... | 715/700 |
| 2007/0256025 A1 | * | 11/2007 | Yen et al. | ...................... | 715/764 |
| 2008/0072175 A1 | * | 3/2008 | Corbett et al. | ............... | 715/810 |
| 2008/0077871 A1 | * | 3/2008 | Baar et al. | ..................... | 715/762 |

(Continued)

*Primary Examiner* — Doon Chow
*Assistant Examiner* — David Choi
(74) *Attorney, Agent, or Firm* — Law Office of Jim Boice

(57) ABSTRACT

A computer-implemented method, system and computer program product for positioning a context menu on a Graphical User Interface (GUI) are presented. A cursor over a selected element on the GUI is clicked to display a context window. When scrolling to a chosen option within the context window occurs, the entire context menu moves, thus keeping the selected element aligned next to a scrolled-to option in the context window.

8 Claims, 4 Drawing Sheets

U.S. PATENT DOCUMENTS

| | | | |
|---|---|---|---|
| 2008/0184147 A1* | 7/2008 | Anderson et al. | 715/768 |
| 2008/0263462 A1* | 10/2008 | Mayer-Ullmann et al. | 715/762 |
| 2009/0049381 A1* | 2/2009 | Robertson et al. | 715/700 |
| 2009/0073114 A1* | 3/2009 | Bay et al. | 345/156 |
| 2009/0089673 A1 | 4/2009 | Allen, Jr. et al. | |
| 2009/0100321 A1* | 4/2009 | Singh et al. | 715/205 |
| 2009/0132919 A1 | 5/2009 | Allen, Jr. et al. | |
| 2010/0033503 A1* | 2/2010 | Baar et al. | 345/647 |
| 2010/0251175 A1* | 9/2010 | Brunkhorst et al. | 715/811 |
| 2010/0275118 A1* | 10/2010 | Iakobashvili et al. | 715/257 |
| 2011/0078630 A1* | 3/2011 | Duquene et al. | 715/823 |

\* cited by examiner

AUTO-POSITIONING A CONTEXT MENU ON A GUI

BACKGROUND OF THE INVENTION

1. Technical Field

The present disclosure relates to the field of computers, and Graphical User Interfaces (GUIs). Still more specifically, the present disclosure relates to context menus displayed on GUIs.

2. Description of the Related Art

A context menu is a pop-up menu that offers a listing of options (files, services, functions, etc.) that are related to a displayed element on a Graphical User Interface (GUI). A typical context menu 102 is shown in the GUI 104 depicted in FIG. 1. In the example illustrated in FIG. 1, a cursor 106 has previously been positioned over a selected primary element 108 that is in a pane 110. While the cursor 106 was positioned over the selected primary element 108, a user clicked a mouse, thereby calling up the context menu 102 to appear in the GUI 104. As depicted, the context menu 102 presents multiple commands, services, functions, links, etc. that are related to the selected primary element 108. The context menu 102 is auto-positioned away from the pane 110 to prevent obscuring other elements within the pane 110.

Note that, in the example depicted in FIG. 1, the user wants to utilize the option 112 ("Joel Menu"). To call option 112, the cursor 106 is scrolled down to option 112, causing it to be highlighted as shown. The user can then click option 112 to pull up "Joel Menu." Note that that displaying the context menu 102 as shown can lead to the selected option 112 being off the displayed portion of the GUI 104. That is, assume that the displayed portion of GUI 104 actually is limited to the area shown within the dotted box 114. In that case, selected option 112 is no longer visible to the user, unless the user moves the slider bar 116 down to display the selected option 112.

SUMMARY OF THE INVENTION

To address the above described issue, a computer-implemented method, system and computer program product for positioning a context menu on a Graphical User Interface (GUI) are presented. A cursor over a selected element on the GUI is clicked to display a context window. When scrolling to a chosen option within the context window occurs, the entire context menu moves, thus keeping the selected element aligned next to a scrolled-to option in the context window.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
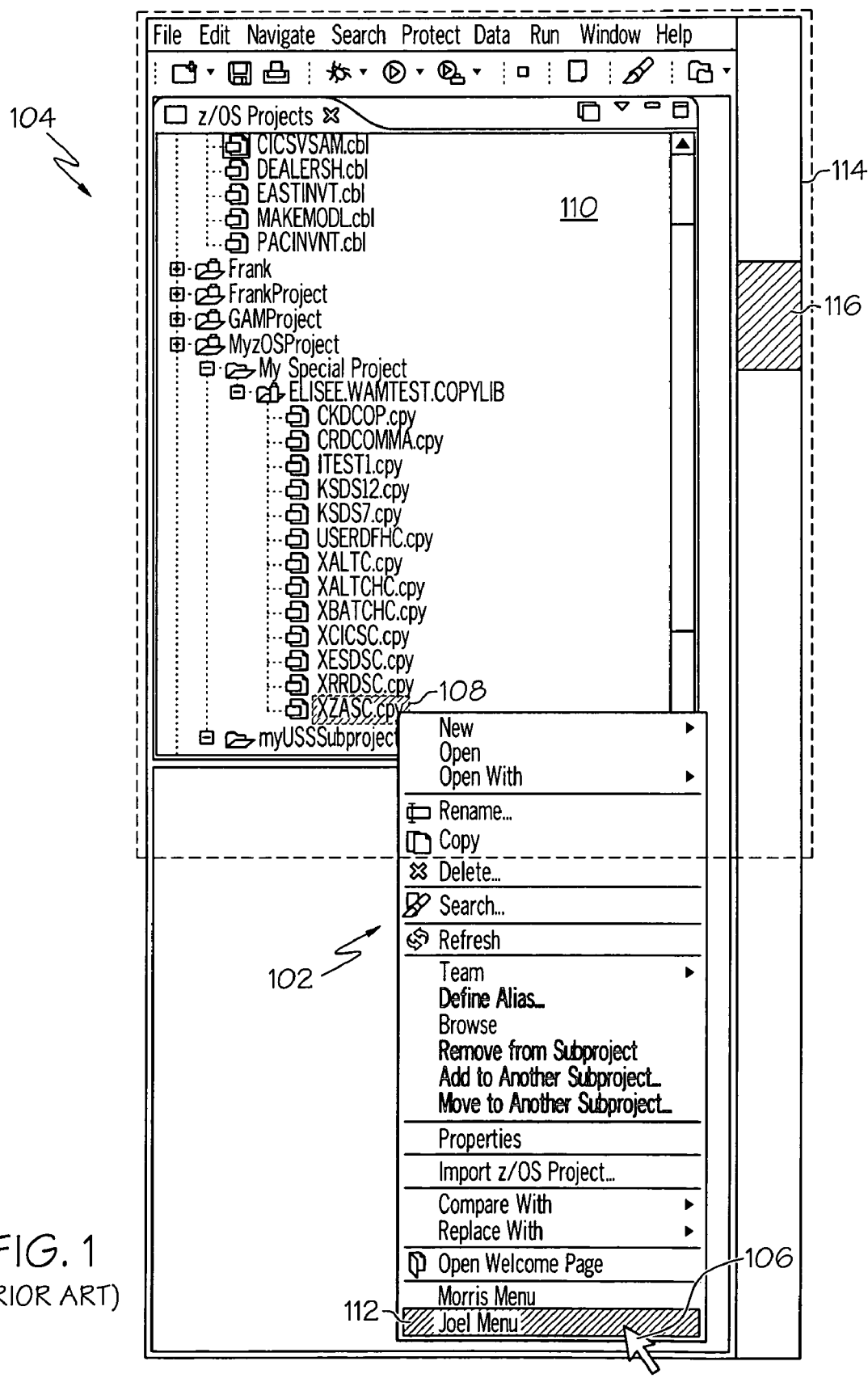
FIG. 1 depicts a prior art context window.
Figure 2:
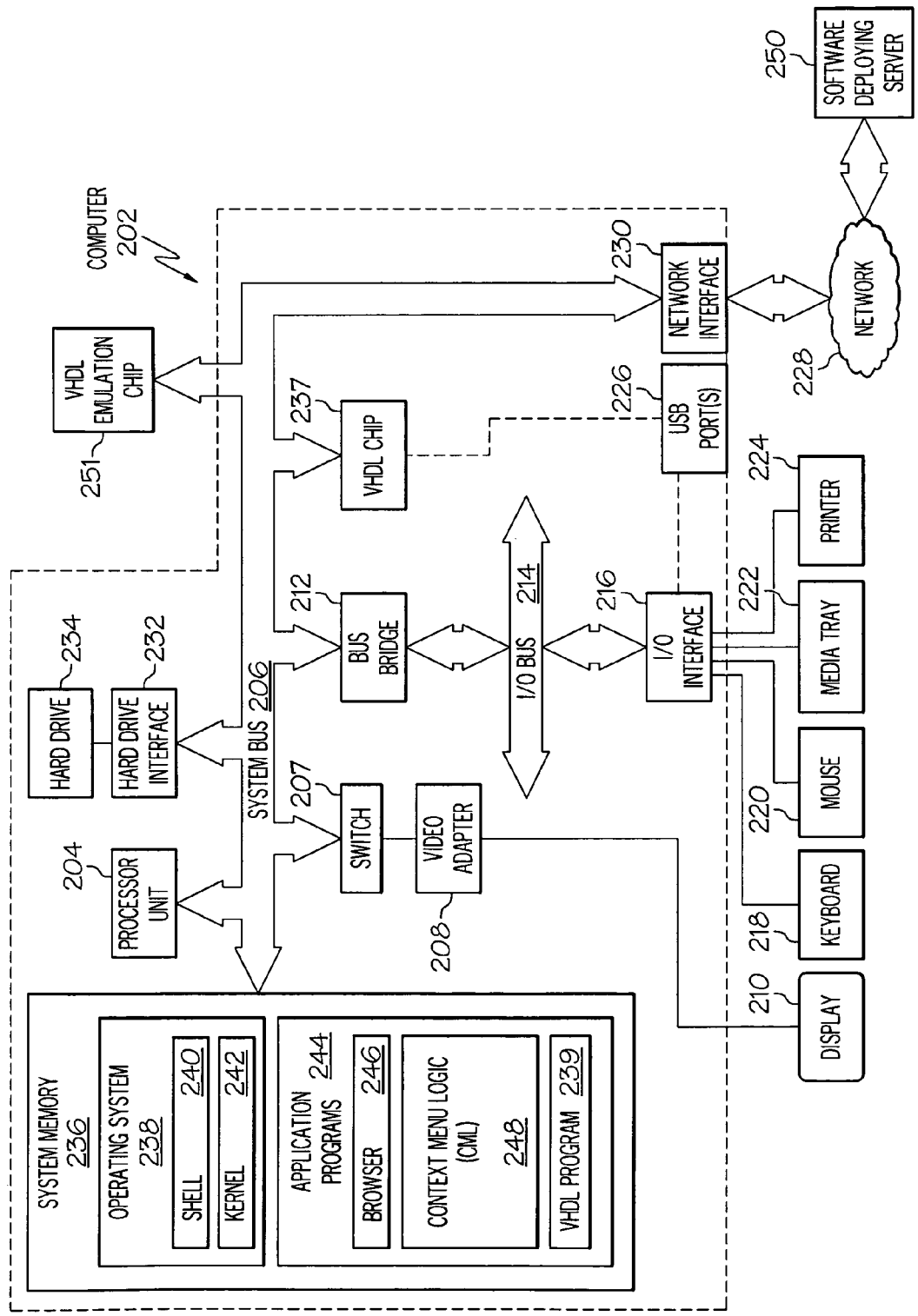
FIG. 2 depicts an exemplary computer in which the present invention may be implemented.

With reference now to FIG. 2, there is depicted a block diagram of an exemplary computer 202, which may be utilized by the present invention. Note that some or all of the exemplary architecture shown for computer 202 may be utilized by software deploying server 250.

Computer 202 includes a processor unit 204 that is coupled to a system bus 206. Processor unit 204 may utilize one or more processors, each of which has one or more processor cores. A video adapter 208, which drives/supports a display 210, is also coupled to system bus 206. In one embodiment, a switch 207 couples the video adapter 208 to the system bus 206. Alternatively, the switch 207 may couple the video adapter 208 to the display 210. In either embodiment, the switch 207 is a switch, preferably mechanical, that allows the display 210 to be coupled to the system bus 206, and thus to be functional, only upon execution of instructions (e.g., Context Menu Logic—CML 248 described below) that perform the method described herein. This switching causes a substantive transformation of the computer 202 from a system in which pending steps and/or results of the herein described method are NOT displayed, into a system in which these results ARE displayed.

System bus 206 is coupled via a bus bridge 212 to an Input/Output (I/O) bus 214. An I/O interface 216 is coupled to I/O bus 214. I/O interface 216 affords communication with various I/O devices, including a keyboard 218, a mouse 220, a media tray 222 (which may include storage devices such as CD-ROM drives, multi-media interfaces, etc.), a printer 224, and (if a VHDL chip 237 is not utilized in a manner described below), USB port(s) 226. While the format of the ports connected to I/O interface 216 may be any known to those skilled in the art of computer architecture, in a preferred embodiment some or all of these ports (besides the USB ports 226 themselves) are Universal Serial Bus (USB) ports.

As depicted, computer 202 is able to communicate with a software deploying server 250 via a network 228. Communication between the computer 202 and network 228 is via a network interface 230. Network 228 may be an external network such as the Internet, or an internal network such as an Ethernet or a Virtual Private Network (VPN).

A hard drive interface 232 is also coupled to system bus 206. Hard drive interface 232 interfaces with a hard drive 234. In a preferred embodiment, hard drive 234 populates a system memory 236, which is also coupled to system bus 206. System memory is defined as a lowest level of volatile memory in computer 202. This volatile memory includes additional higher levels of volatile memory (not shown), including, but not limited to, cache memory, registers and buffers. Data that populates system memory 236 includes computer 202's operating system (OS) 238 and application programs 244.

OS 238 includes a shell 240, for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while shell 240 is a text-based, line-oriented user interface, the present invention will equally well support other user interface modes, such as graphical, voice, gestural, etc.

As depicted, OS 238 also includes kernel 242, which includes lower levels of functionality for OS 238, including providing essential services required by other parts of OS 238 and application programs 244, including memory management, process and task management, disk management, and mouse and keyboard management.

Application programs 244 include a renderer, shown in exemplary manner as a browser 246. Browser 246 includes program modules and instructions enabling a World Wide Web (WWW) client (i.e., computer 202) to send and receive network messages to the Internet using HyperText Transfer Protocol (HTTP) messaging, thus enabling communication with software deploying server 250 and other described computer systems.

Application programs 244 in computer 202's system memory (as well as software deploying server 250's system memory) also include a Context Menu Logic (CML) 248. CML 248 includes code for implementing the processes described below, including those described in FIGS. 3-4. In one embodiment, computer 202 is able to download CML 248 from software deploying server 250, including in an on-demand basis. Note further that, in one embodiment of the present invention, software deploying server 250 performs all of the functions associated with the present invention (including execution of CML 248), thus freeing computer 202 from having to use its own internal computing resources to execute CML 248.

Also stored in system memory 236 is a VHDL (VHSIC Hardware Description Language) program 239. VHDL is an exemplary design-entry language for Field Programmable Gate Arrays (FPGAs), Application Specific Integrated Circuits (ASICs), and other similar electronic devices. In one embodiment, execution of instructions from CML 248 causes VHDL program 239 to configure VHDL chip 237, which may be an FPGA, ASIC, etc. This programming of VHDL chip 237 causes a substantial transformation of the architecture of computer 202, wherein (assuming that USB port(s) 226 are NOT coupled to I/O interface 216) USB port(s) 226 are now selectively coupled to system bus 206 via VHDL chip 237.

In another embodiment of the present invention, execution of instructions from CML 248 results in a utilization of VHDL program 239 to program a VHDL emulation chip 251. VHDL emulation chip 251 may incorporate a similar architecture as described above for VHDL chip 237. Once CML 248 and VHDL program 239 program VHDL emulation chip 251, VHDL emulation chip 251 performs, as hardware, some or all functions described by one or more executions of some or all of the instructions found in CML 248. That is, the VHDL emulation chip 251 is a hardware emulation of some or all of the software instructions found in CML 248. In one embodiment, VHDL emulation chip 251 is a Programmable Read Only Memory (PROM) that, once burned in accordance with instructions from CML 248 and VHDL program 239, is permanently transformed into a new circuitry that performs the functions of executed software instructions found in CML 248. Thus, VHDL emulation chip 251 is also properly viewed as a machine that is under the control of computer 202. Note that while VHDL emulation chip 251 is depicted as being a different entity that is separate from computer 202, in another embodiment VHDL emulation chip 251 may be an integral part of computer 202.

The hardware elements depicted in computer 202 are not intended to be exhaustive, but rather are representative to highlight essential components required by the present invention. For instance, computer 202 may include alternate memory storage devices such as magnetic cassettes, Digital Versatile Disks (DVDs), Bernoulli cartridges, and the like. These and other variations are intended to be within the spirit and scope of the present invention.

Figure 3:
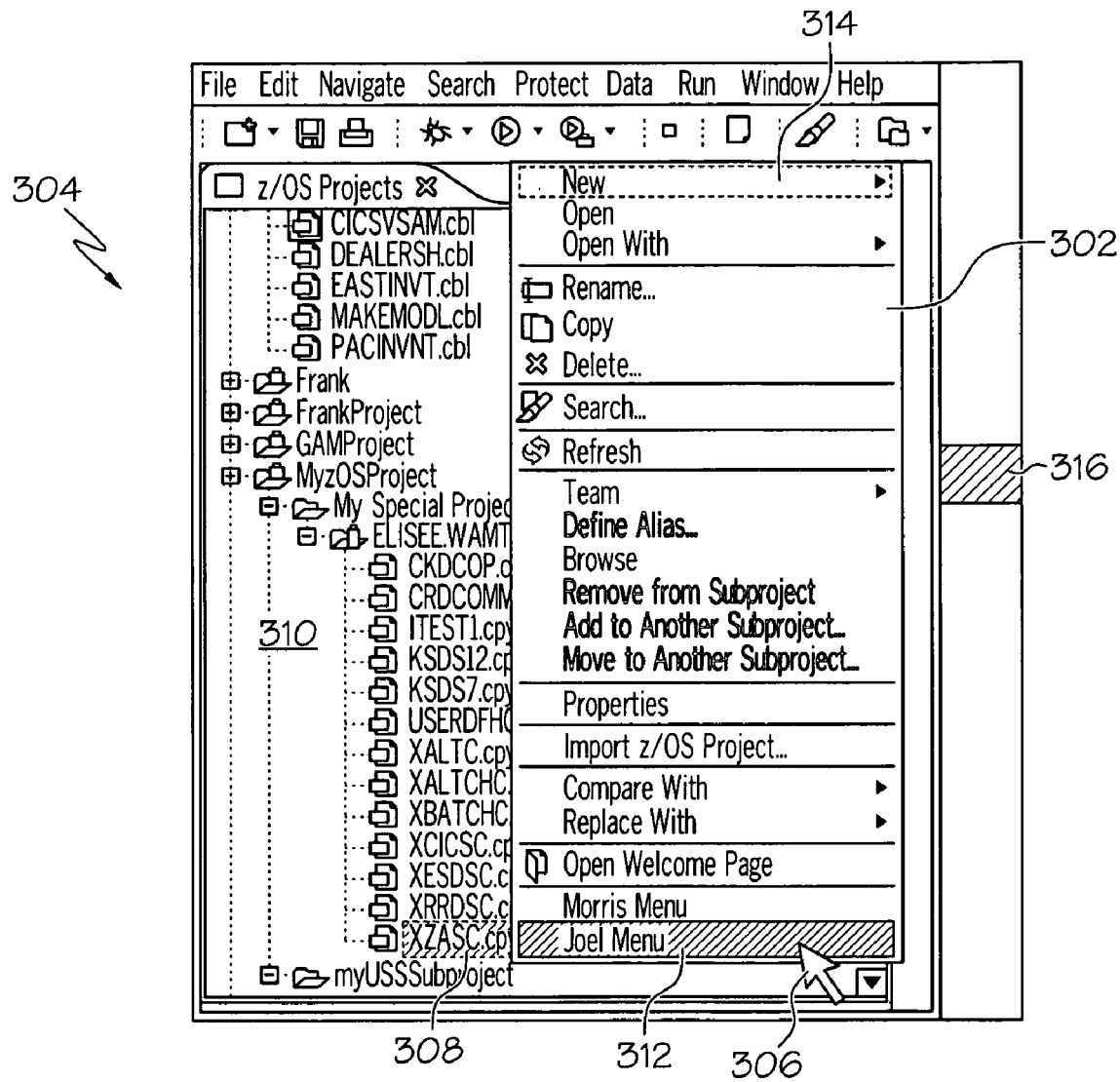
FIG. 3 illustrates a Graphical User Interface (GUI) that utilizes context window positioning in accordance with an embodiment of the present invention.

With reference now to FIG. 3, a novel context menu 302 in accordance with the present invention is presented. Context menu 302 presents options such as services, logic, functions, links and other support elements for a selected primary element 308 from a pane 310. The options shown in context menu 302 may be pre-installed as part of GUI 304, or they may be added by customization performed by a user. For purposes of illustration, assume that a user has hovered a cursor over the selected primary element 308, and optionally clicked a mouse, to highlight that selected primary element 308. This causes context menu 302 to appear on the GUI 304. Assume also that when the context menu 302 first appeared, option 314 ("New") was aligned next to selected primary element 308. As a user scrolled down the options shown in context menu 302 however, cursor 306 remained fixed in place while the entire context menu 302 moved upwards. That is, the selected primary element 308 remains aligned (e.g., on the same horizontal axis and adjacent to) at all times with whichever option from context menu 302 is under the cursor 306. Scrolling through the options in context menu 302 may be accomplished by scrolling a wheel on a mouse, or by dragging the cursor 306 to new locations on the context menu 302. Either action results in the cursor 306 remaining next to the selected primary element 308 while the entire context menu 302 moves. This movement results in the highlighting of each newly scrolled-to option, each of which remains aligned next to the selected primary element 308 during the scrolling process.

Thus, the selected primary element 308 and newly scrolled-to options from the context menu 302 remain adjacent to one another (and optionally are both highlighted) while the context menu 302 moves upward or downward, depending on the direction of the user's scrolling operation. As depicted, there is no need to use the scroll bar 316 to change the view of the entire GUI 304, since the relevant selected primary element 308 ("XZASC.cpy") and the scrolled-to option 312 ("Joel Menu") remain next to each other. Note that it does not matter if the moving context menu 302 obscures other information on the GUI 304, or even if it partially leaves a current context viewing area for GUI 304, since the important elements (308 and 312) always remain visible and aligned next to one another.

In one embodiment of the present invention, both the pane 310 and the context menu 302 are repositioned when a user scrolls through the options shown in the context menu 302. Thus, the selected primary element 308 and the scrolled-to option 312 remain aligned next to one another by a combination of the repositioning of the pane menu 310 and the context menu 302 (such dual repositioning not shown in FIG. 3).

While FIG. 3 represents an exemplary embodiment of the present invention, note that the concepts described herein are equally applicable to use with other selected primary elements on a GUI. For example, the selected primary element may be an option from a drop-down menu from a tool bar, such that clicking that option results in a context menu "popping up" to show sub-options available to the option from the drop-down menu. Thus, a directory tree such as shown in pane 310 in FIG. 3, a drop-down menu (not shown), and any other pane or area on a GUI may present the selected primary element discussed herein, such that activating (e.g., "clicking") that element results in the display of the associated context menu for that selected primary element.

Figure 4:
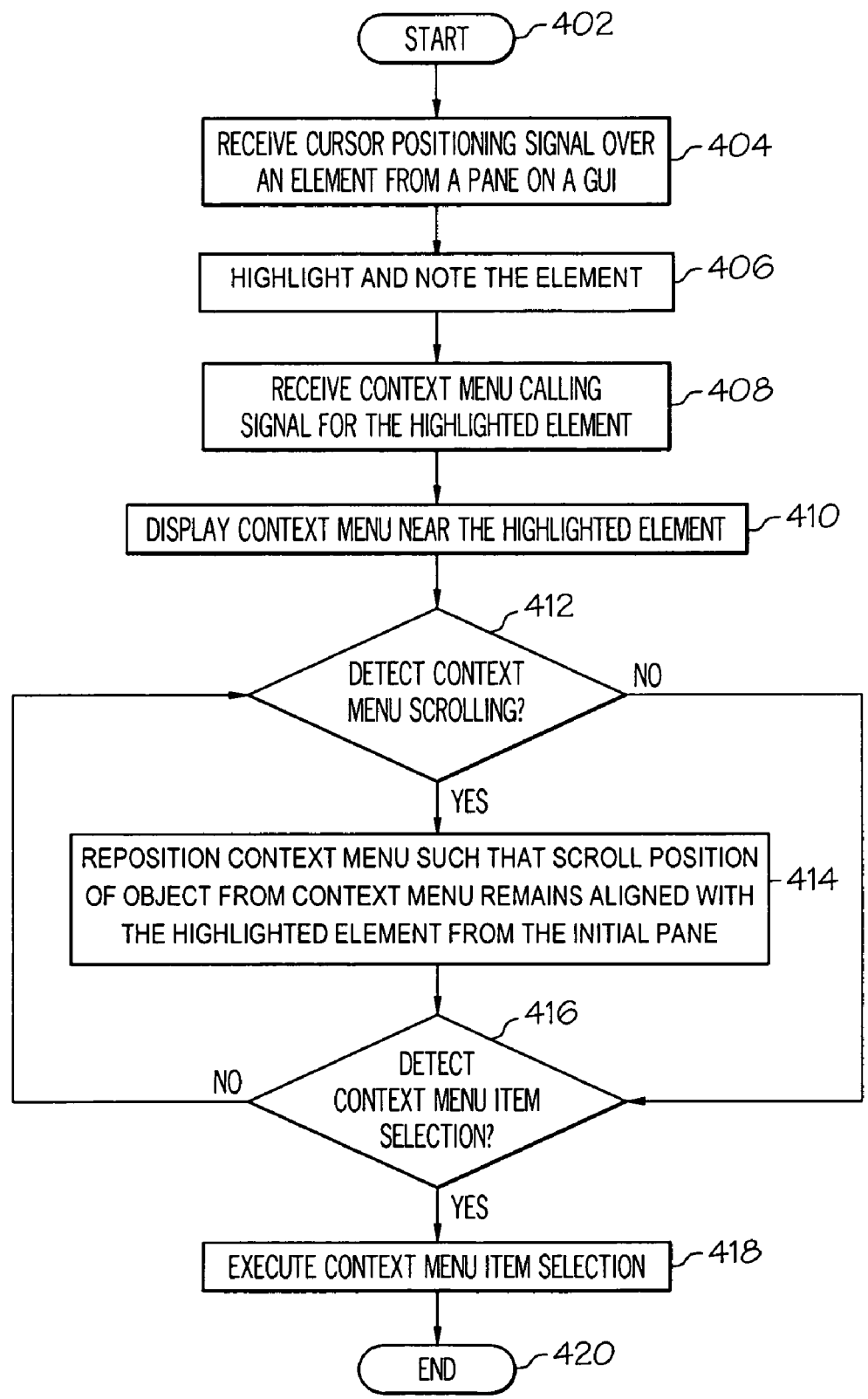
FIG. 4 is a high-level flowchart of exemplary steps taken to dynamically reposition a context window while a user scrolls through displayed options in the context window.

Referring now to FIG. 4, a high-level flow chart of exemplary steps taken to manage a position of a context menu on a GUI is presented. At initiator block 402, a specific processor (e.g., processor 204 shown in FIG. 2) loads and executes instructions (e.g., from CML 248, also shown in FIG. 2) to perform the following steps, either in the order shown or in one or more alternative orders. As described in block 404, the processor receives a cursor positioning signal over an element ("selected primary element") from the GUI (e.g., selected primary element 308 shown in pane 310 in FIG. 3). This results in that element being highlighted (block 406), as well as a primary element selection signal being sent to and received by the processor, indicating that the primary element has been selected. This primary element selection signal also results in a request (e.g., a context menu calling signal from logic such as CML 248 shown in FIG. 2) being sent to and received by the processor to display a context menu that is associated with that element. This request is received (block 408), and the context menu that is specific for that highlighted selected primary element is displayed next to the highlighted selected primary element (block 410). There are several options regarding how the context menu is initially displayed. A default display merely positions the top (or bottom) element of the context menu next to the selected primary element from the pane. Alternatively, the context menu may be aligned such that a most recently used or a most frequently used option from the context menu is aligned next to the highlighted selected primary element from the pane. In that scenario, the processor determines which context menu option is a most significant context menu option and, in response to the context menu being displayed on the GUI, automatically visually aligns the most significant context menu option next to the selected primary element on the GUI. In one embodiment, even if the entire context menu is repositioned such that a most significant (most recently used, most frequently used, etc.) context menu item is initially aligned with the highlighted selected primary element from the pane, all of the context menu items (e.g., "New", "Open" . . . "Joel Menu") remain in their same original order, no matter which option from the context menu is initially aligned with the highlighted selected primary element.

If scrolling up or down through the context menu is detected through the receipt of a scrolling signal that indicates that a user is scrolling through options in the context menu (query block 412), the entire context menu is moved in the opposite direction, such that the highlighted selected primary element from the pane and a scrolled-to context menu option remain aligned next to one another while the context menu moves accordingly (block 414). If the user ultimately selects an option from the context menu to be executed such that the processor receives a selection signal for the current scrolled-to option (query block 416), that selected option is executed (block 418) in a normal manner by receiving and acting upon a selection signal for the selected context menu item ("selection option"). The process ends at terminator block 420.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), and writable storage media (e.g., hard disk drive, read/write CD ROM, optical media). It should be understood, therefore, that such storage media when encoded with computer readable instructions that direct method functions in the present invention, represent alternative embodiments of the present invention. Further, it is understood that the present invention may be implemented by a system having means in the form of hardware, software, or a combination of software and hardware as described herein or their equivalent.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA. Applying the VHDL instructions to the VHDL chip not only causes a physical transformation of the VHDL chip, but such VHDL instruction application can also cause a specifically loaded VHDL chip to be newly coupled (physically and/or logically) to other hardware within a computer system, thus causing an additional physical transformation of the computer system.

Having thus described the invention of the present application in detail and by reference to illustrative embodiments thereof, it will be apparent that modifications and variations are possible without departing from the scope of the invention defined in the appended claims.

What is claimed is:

1. A computer-implemented method of controlling a view of a context menu on a Graphical User Interface (GUI), the computer-implemented method comprising:
   executing instructions on a specific processor, wherein the instructions, when executed, perform a process comprising:
   receiving a primary element selection signal, wherein the primary element selection signal indicates a selection of a selected primary element on a GUI;

in response to detecting a context menu calling signal, displaying a context menu that is associated with the selected primary element;

in response to detecting a user hovering a cursor over different options in the context menu, repositioning the context menu to keep the selected primary element visually aligned next to and abutting a currently hovered-over option in the context menu, wherein the selected primary element is displayed in a pane on the GUI, and wherein the pane is repositioned during the user hovering, wherein the selected primary element remains visually aligned next to and abutting the currently hovered-over option in the context menu by simultaneously repositioning both the pane and the context menu during the user hovering;

determining which context menu option is a most significant context menu option; and in response to the context menu being displayed on the GUI, automatically visually aligning the most significant context menu option next to the selected primary element on the GUI while preserving all original menu options in the context menu, wherein said selected primary element and said currently hovered-over option are aligned on a same horizontal axis.

2. The computer-implemented method of claim 1, further comprising:

in response to receiving a selection signal for the currently hovered-over option, executing the currently hovered-over option.

3. The computer-implemented method of claim 1, wherein all context menu options in the context menu retain their original order after begin visually aligned.

4. A computer-readable storage medium on which is encoded a computer program, the computer-readable storage medium comprising:

first program instructions for receiving a primary element selection signal, wherein the primary element selection signal indicates a selection of a selected primary element on a GUI;

second program instructions for, in response to detecting a context menu calling signal, displaying a context menu that is associated with the selected primary element;

third program instructions for, in response to detecting a user hovering a cursor over different options in the context menu, repositioning the context menu to keep the selected primary element visually aligned next to and abutting a currently hovered-over option in the context menu, wherein the selected primary element is displayed in a pane on the GUI, and wherein the pane is repositioned during the user hovering, wherein the selected primary element remains visually aligned next to and abutting the currently hovered-over option in the context menu by a combination of repositioning both the pane and the context menu during the user hovering;

fourth program instructions for determining which context menu option is a most significant context menu option; and fifth program instructions for, in response to the context menu being displayed on the GUI, automatically visually aligning the most significant context menu option next to the selected primary element on the GUI, while preserving all original menu options in the context menu, wherein said selected primary element and said currently hovered-over option are aligned on a same axis.

5. The computer-readable storage medium of claim 4, wherein all context menu options in the context menu retain their original order after begin visually aligned.

6. A system comprising:

a processor, a computer readable memory, and a computer readable storage media;

first program instructions for receiving a primary element selection signal, wherein the primary element selection signal indicates a selection of a selected primary element on a GUI;

second program instructions for, in response to detecting a context menu calling signal, displaying a context menu that is associated with the selected primary element;

third program instructions for, in response to detecting a user hovering a cursor over different options in the context menu, repositioning the context menu to keep the selected primary element visually aligned next to and abutting a currently hovered-over option in the context menu, wherein the selected primary element is displayed in a pane on the GUI, and wherein the pane is repositioned during the user hovering, wherein the selected primary element remains visually aligned next to and abutting the currently hovered-over option in the context menu by a combination of repositioning both the pane and the context menu during the user hovering;

fourth program instructions for determining which context menu option is a most significant context menu option; and fifth program instructions for in response to the context menu being displayed on the GUI, automatically visually aligning the most significant context menu option next to the selected primary element on the GUI, wherein said selected primary element and said currently hovered-over option are aligned on a same axis; and wherein said first, second, third, fourth and fifth program instructions are stored on said computer readable storage media for execution by said processor via said computer readable memory.

7. The system of claim 6, wherein all context menu options in the context menu retain their original order after begin visually aligned.

8. The system of claim 6, wherein the program instructions are downloaded from a software deploying server to the system in an on-demand basis.

* * * * *